(12) United States Patent
MacFarlane et al.

(10) Patent No.: US 8,755,971 B2
(45) Date of Patent: Jun. 17, 2014

(54) SYSTEM AND METHOD FOR DETECTING A FAULT IN A RIDE HEIGHT SENSOR

(75) Inventors: Brian A. MacFarlane, Rochester Hills, MI (US); John F. Larsen, Campbellcroft (CA); Steven A. Opiteck, South Lyon, MI (US)

(73) Assignee: GM Global Technology Operations LLC

( * ) Notice: Subject to any disclaimer, the term of this patent is extended or adjusted under 35 U.S.C. 154(b) by 26 days.

(21) Appl. No.: 13/571,778

(22) Filed: Aug. 10, 2012

(65) Prior Publication Data

US 2013/0253763 A1    Sep. 26, 2013

Related U.S. Application Data

(60) Provisional application No. 61/613,592, filed on Mar. 21, 2012.

(51) Int. Cl.
| | |
|---|---|
| *B60G 21/00* | (2006.01) |
| *B60G 17/052* | (2006.01) |
| *B60G 3/00* | (2006.01) |
| *B60G 5/00* | (2006.01) |
| *B60G 9/00* | (2006.01) |
| *B60G 17/056* | (2006.01) |

(52) U.S. Cl.
CPC ............................... *B60G 17/0525* (2013.01); *B60G 17/0565* (2013.01)
USPC .................. 701/37; 701/48; 701/91; 280/5.5; 280/5.507; 280/5.514; 280/5.515; 280/5.52; 280/5.524

(58) Field of Classification Search
CPC ........... B60G 17/0525; B60G 17/0565; B60G 2400/25; B60G 2500/30; B60G 2800/914
USPC ........... 701/37, 48, 91; 280/5.5, 5.507, 5.514, 280/5.515, 5.52, 5.524
See application file for complete search history.

(56) References Cited

U.S. PATENT DOCUMENTS

| | | | | |
|---|---|---|---|---|
| 5,461,564 | A | * | 10/1995 | Collins et al. .................... 701/37 |
| 6,912,477 | B2 | * | 6/2005 | Murray ......................... 702/153 |
| 2001/0005803 | A1 | | 6/2001 | Cochofel et al. |
| 2005/0218632 | A1 | | 10/2005 | Cuevas et al. |
| 2006/0267296 | A1 | * | 11/2006 | Dodd et al. ................ 280/5.512 |
| 2006/0293816 | A1 | | 12/2006 | Li |
| 2007/0128899 | A1 | * | 6/2007 | Mayer ........................... 439/152 |

(Continued)

FOREIGN PATENT DOCUMENTS

WO    WO-2005097559 A2    10/2005

OTHER PUBLICATIONS

U.S. Appl. No. 13/589,576, filed Aug. 20, 2012, MacFarlane et al.

*Primary Examiner* — Mary Cheung
*Assistant Examiner* — Atul Trivedi

(57) ABSTRACT

A system according to the principles of the present disclosure includes a variance determination module and a fault detection module. The variance determination module determines a variance of samples generated from a ride height signal. The ride height signal is output by a ride height sensor that detects a ride height of a vehicle. The fault detection module detects a fault in the ride height sensor based on the variance.

21 Claims, 4 Drawing Sheets

(56) References Cited

U.S. PATENT DOCUMENTS

2008/0021611 A1* 1/2008 Hiebert et al. ................. 701/37
2009/0099735 A1* 4/2009 McCoy et al. ................. 701/46
2009/0105905 A1  4/2009 Hoffman
2011/0257900 A1* 10/2011 Adams et al. .................. 702/33
2013/0253763 A1* 9/2013 MacFarlane et al. ........... 701/37
2013/0275002 A1* 10/2013 MacFarlane et al. ........... 701/37

* cited by examiner

SYSTEM AND METHOD FOR DETECTING A FAULT IN A RIDE HEIGHT SENSOR

CROSS-REFERENCE TO RELATED APPLICATIONS

This application claims the benefit of U.S. Provisional Application No. 61/613,592, filed on Mar. 21, 2012. The disclosure of the above application is incorporated herein by reference in its entirety.

FIELD

The present disclosure relates to vehicle suspensions, and more specifically to systems and methods for detecting a fault in a ride height sensor.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicle suspensions typically include springs, shock absorbers, and linkages that connect a frame or body of a vehicle to wheels of the vehicle. Suspension systems affect vehicle ride and handling. Vehicle ride and handling affect safety, drivability, and whether vehicle occupants are isolated from road noise, bumps, and vibrations.

Air suspension is a type of vehicle suspension that typically includes air shocks or air springs, an air pump or compressor that is electric or engine-driven, and a control valve that may be adjusted to release air from the air bags. The compressor pressurizes air in the air bags, which in turn act as springs. The pressure in the air bags may be controlled to improve ride quality and/or to provide a self-leveling suspension. A self-leveling suspension maintains a vehicle at a desired ride height regardless of the load on the vehicle. Self-leveling suspensions may include a ride-height sensor so that the ride height of a vehicle may be controlled using closed-loop feedback.

SUMMARY

A system according to the principles of the present disclosure includes a variance determination module and a fault detection module. The variance determination module determines a variance of samples generated from a ride height signal. The ride height signal is output by a ride height sensor that detects a ride height of a vehicle. The fault detection module detects a fault in the ride height sensor based on the variance.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

A suspension control system and method may control the ride height of a vehicle based on feedback received from a ride height sensor. The ride height sensor may output a voltage indicating the ride height. For example, the voltage may range from 0 volts (V) to 5 V, and the voltage may be about 2.5 V at a desired ride height. A fault may be detected when the voltage is outside of a predetermined range (e.g., between 0.25 V and 4.75 V) for a predetermined sample count. A fault such as an open or short circuit may cause the voltage to be stuck outside of the predetermined range.

In some cases, a fault may cause the voltage output by the ride height sensor to be stuck within the predetermined range. Detecting this type of fault may ensure that a vehicle is maintained at a desired ride height despite inaccuracies in the output voltage. However, this type of fault may not be detected if a fault in the ride height sensor is only detected when the output voltage is outside of the predetermined range.

A suspension control system and method according to the present disclosure detects a fault in a ride height sensor based on a variance of a ride height signal, such as a voltage signal, output by a ride height sensor. The ride height signal is expected to vary by a certain amount when a vehicle is moving due to suspension movement. Thus, a fault is detected when the ride height signal does not vary as expected. Samples are generated from the ride height signal, and the variance of the samples is calculated. A fault is detected when the variance is less than a threshold and a vehicle speed is greater than a predetermined speed. Detecting a fault based on the variance of the ride height signal ensures that a fault is detected regardless of whether the fault causes the ride height signal to be stuck outside of or within the predetermined range.

A remedial action is taken when a fault is detected to maintain the vehicle at a desired ride height. If a vehicle has multiple ride height sensors, the remedial action may include controlling a self-leveling suspension, such as an air suspension, based on feedback from a ride height sensor in which a fault is not detected. If a fault is detected in all of the ride height sensors, the remedial action may include controlling the air suspension based on feedback from a pressure sensor that detects pressure within air bags in the air suspension. If a fault is also detected in the pressure sensor, the remedial action may include holding open a control valve to release pressure from the air bags.

Figure 1:
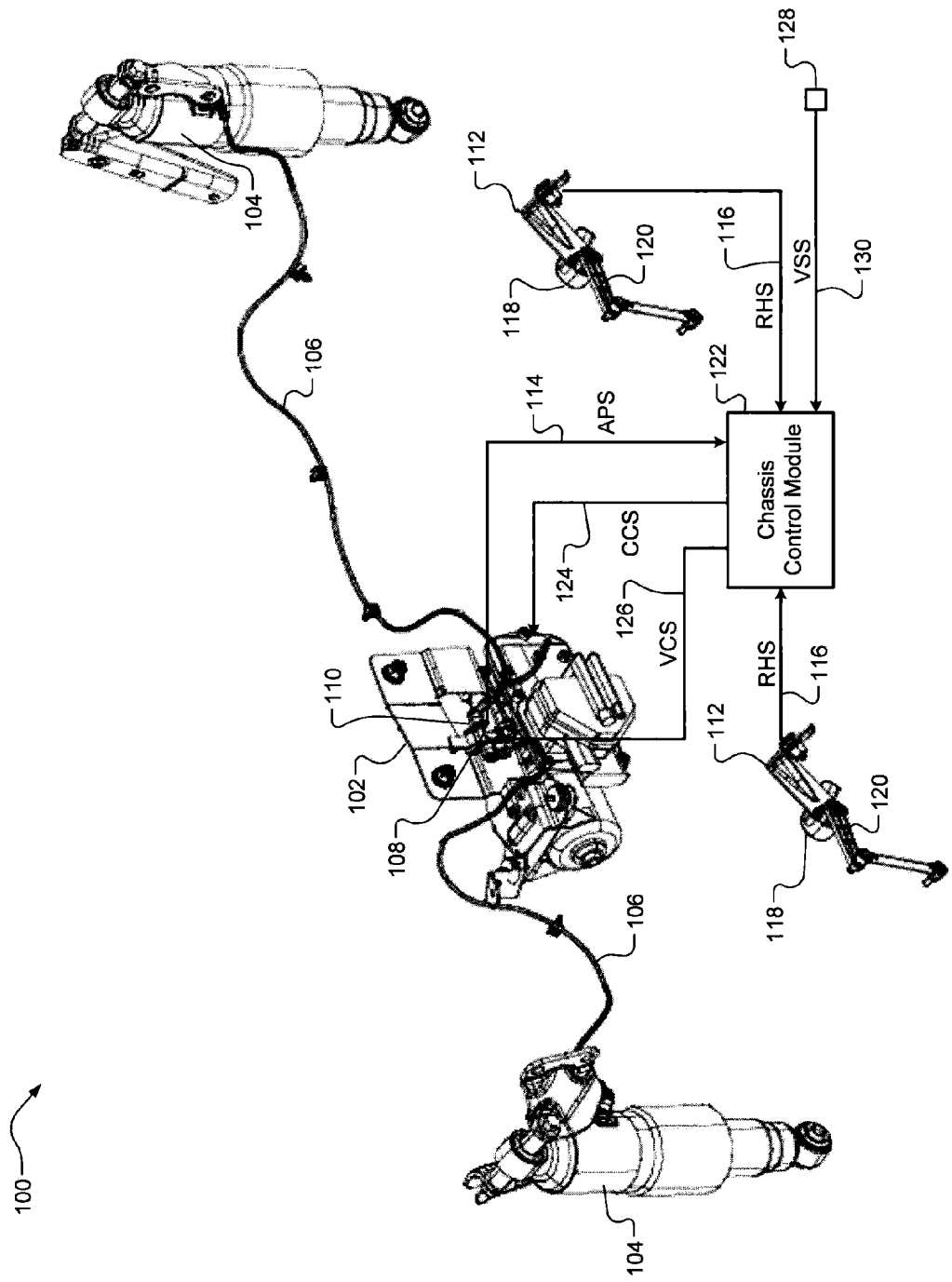
FIG. 1 is partially a perspective view and partially a functional block diagram of an example suspension system according to the principles of the present disclosure.

Referring now to FIG. 1, a suspension system 100 includes an air pump or compressor 102, air bags 104, air lines 106, a control valve 108, a pressure sensor 110, and ride height sensors 112. The compressor 102 may be operated to pressurize air in the air bags 104. The compressor 102 may be electric or engine-driven. The air bags 104 may be included in air shocks or air springs. Although the suspension system 100 is depicted as an air suspension, a suspension control system and method according to the principles of the present disclosure applies to other suspension types.

The air lines 106 are routed between the compressor 102 and the air bags 104. The control valve 108 may be adjusted to release air from the air bags 104. The pressure sensor 110 outputs an air pressure signal (APS) 114 indicating the pressure within the air bags 104. The control valve 108 and the pressure sensor 110 may be included in the compressor 102, the air bags 104, and/or the air lines 106.

The ride height sensors 112 output a ride height signal (RHS) 116 indicating the ride height of a vehicle. The ride height sensors 112 each include a sensor body 118 and a sensor arm 120. The sensor body 118 may be mounted to a frame or body and the sensor arm 120 may be attached to a suspension component such as a link.

The sensor body 118 houses a sensor that detects an absolute position of the sensor arm 120 relative to the sensor body 118 and/or movement of the sensor arm 120 relative to the sensor body 118. The sensor may be an inductive sensor (e.g., an anisotropic magneto-resistance sensor), an optical sensor, or a hall effect sensor. Although the suspension system 100 is depicted as including two ride height sensors, the suspension system 100 may include more or less ride height sensors.

A control module 122 controls the suspension system 100 to maintain the vehicle at a desired ride height despite changes in the load on the vehicle. The control module 122 adjusts the pressure within the air bags 104 to adjust the ride height. The control module 122 controls the compressor 102 and the control valve 108 to adjust the pressure within the air bags 104. The control module 122 outputs a compressor control signal (CCS) 124 to control the compressor 102. The control module 122 outputs a valve control signal (VCS) 126 to control the control valve 108.

The control module 122 adjusts the ride height based on input received from the pressure sensor 110 and/or the ride height sensors 112. The control module 122 detects a fault in the ride height sensors 112 based on input received from the pressure sensor 110, the ride height sensors 112, and/or a vehicle speed sensor 128, as described below. The vehicle speed sensor 128 outputs a vehicle speed signal (VSS) 130 indicating a vehicle speed. The control module 122 takes a remedial action when a fault is detected in the pressure sensor 110 and/or the ride height sensors 112, as described below.

Figure 2:
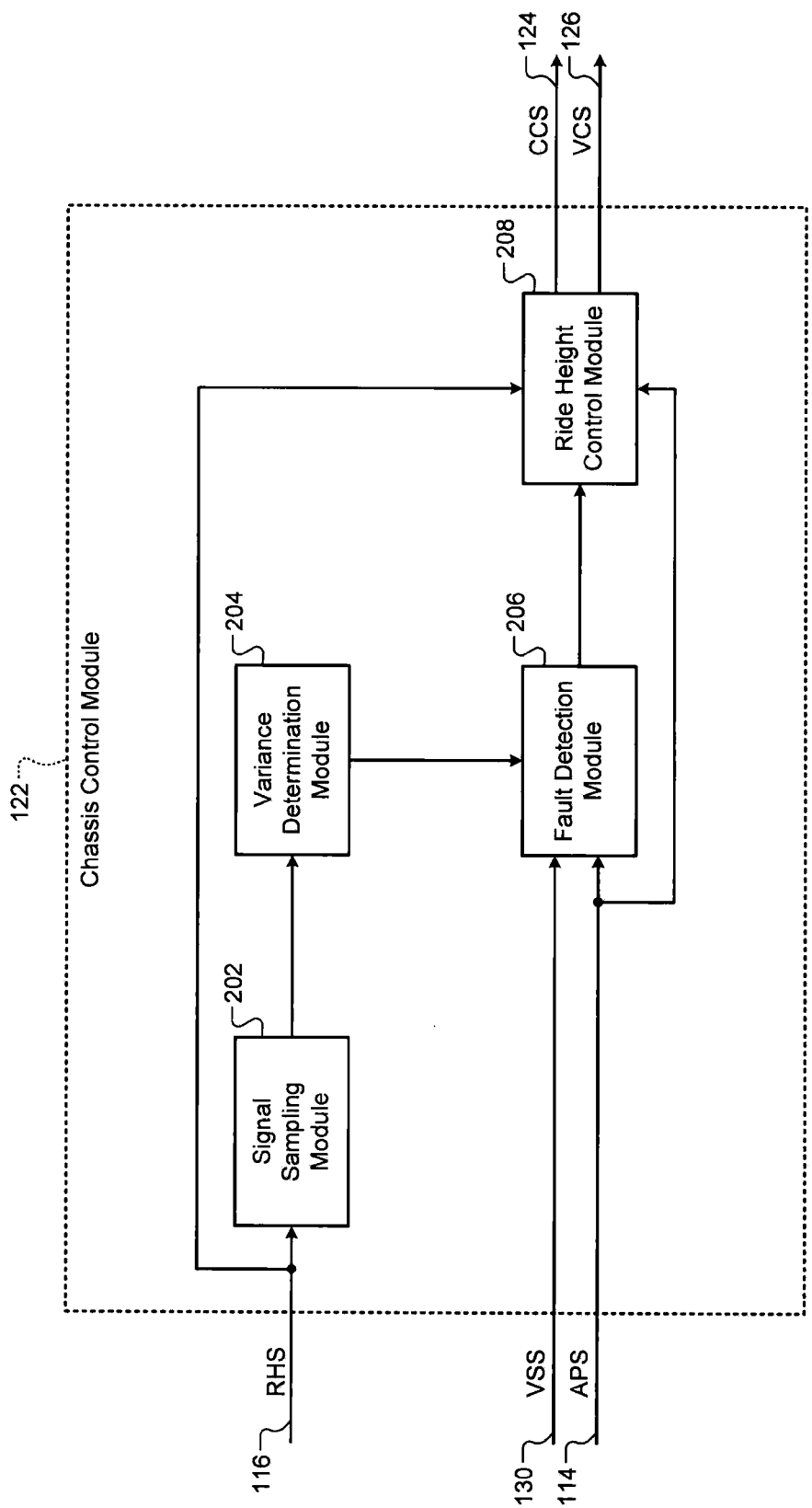
FIG. 2 is a functional block diagram of an example suspension control system according to the principles of the present disclosure.

Referring now to FIG. 2, an example implementation of the control module 122 includes a signal sampling module 202, a variance determination module 204, a fault detection module 206, and a ride height control module 208. The signal sampling module 202 generates samples from the ride height signal 116 and outputs the samples generated. The signal sampling module 202 may sample the ride height signal 116 at a predetermined sampling rate. The signal sampling module 202 may generate a number of samples from the ride height signal 116 before outputting the samples generated. The number may be predetermined and/or may vary based on the sampling rate used to generate the samples.

The variance determination module 204 determines the variance of samples generated from the ride height signal 116. The number of samples used to determine the variance may be predetermined and/or may vary based on the sampling rate used to generate the samples. The variance determination module 204 may determine the average (AVG) and the variance (V) of N samples ($X_{1-N}$) using the following equations:

$$V(X_{1-N}) = \Sigma(X_{1-N} - AVG)^2 / N; \text{ and} \quad (1)$$

$$AVG = \Sigma(X_{1-N})/N. \quad (2)$$

The variance determination module 204 outputs the variance.

The fault detection module 206 detects a fault in the one of the ride height sensors 112 that output the ride height signal 116 from which the samples are generated based on the variance of the ride height signal 116. The fault detection module 206 may detect a fault when the variance of the ride height signal 116 is less than a first value (e.g., 0.004 millimeter$^2$) and the vehicle speed indicated by the vehicle speed signal 130 is greater than a first speed (e.g., 10 kilometers per hour (kph)). The first value and the first speed may be predetermined through calibration by driving a vehicle at low speeds (e.g., between 1 kph and 10 kph) on a smooth surface where almost no suspension movement is expected. The first value may be a constant value. Alternatively, the first value may vary based on the vehicle speed. For example, the first value may increase as the vehicle speed increases and the first value may decrease as the vehicle speed decreases.

The fault detection module 206 may detect a fault in the pressure sensor 110 based on the air pressure signal 114. The air pressure signal 114 may be a voltage signal that ranges from 0 V to 5 V. The fault detection module 206 may detect a fault in the pressure sensor 110 when the air pressure signal 114 is outside of a predetermined range (e.g., between 0.25 V and 4.75 V) for a predetermined sample count (e.g., 80 counts out of 100 counts). The fault detection module 206 outputs a signal indicating whether a fault is detected in the pressure sensor 110 or the ride height sensors 112.

The ride height control module 208 controls the ride height of the vehicle based on the ride height signal 116. The ride height control module 208 may control the ride height to minimize a difference between an actual ride height indicated by the ride height signal 116 and a desired ride height. The ride height control module 208 may control the ride height by adjusting operation of the compressor 102 via the compressor control signal 124. Additionally or alternatively, the ride height control module 208 may control the ride height by adjusting the control valve 108 via the valve control signal 126.

The ride height control module 208 may control the ride height based on input received from both of the ride height sensors 112 when a fault is not detected in ether of the ride height sensors 112. For example, the ride height sensors 112 may be on opposite sides of the vehicle, and the ride height control module 208 may control the ride height on each side based on input received from the corresponding one of the ride height sensors 112. The ride height control module 208 may control the ride height of the vehicle (e.g., on both sides) based on input received from only one of the ride height sensors 112 when a fault is detected in the other one of the ride height sensors 112.

The ride height control module 208 may disable the compressor 102 and/or control the ride height of the vehicle based on the air pressure signal 114 when, for example, a fault is detected in both of the ride height sensors 112. The ride height control module 208 may control the ride height by adjusting the control valve 108 to minimize a difference between an actual air pressure indicated by the air pressure signal 114 and a desired air pressure. The desired air pressure may be predetermined to yield a desired ride height. The ride height control module 208 may hold open the control valve 108 to depressurize the air bags 104 when a fault is detected in the pressure sensor 110 and in both of the ride height sensors 112.

Figure 3:
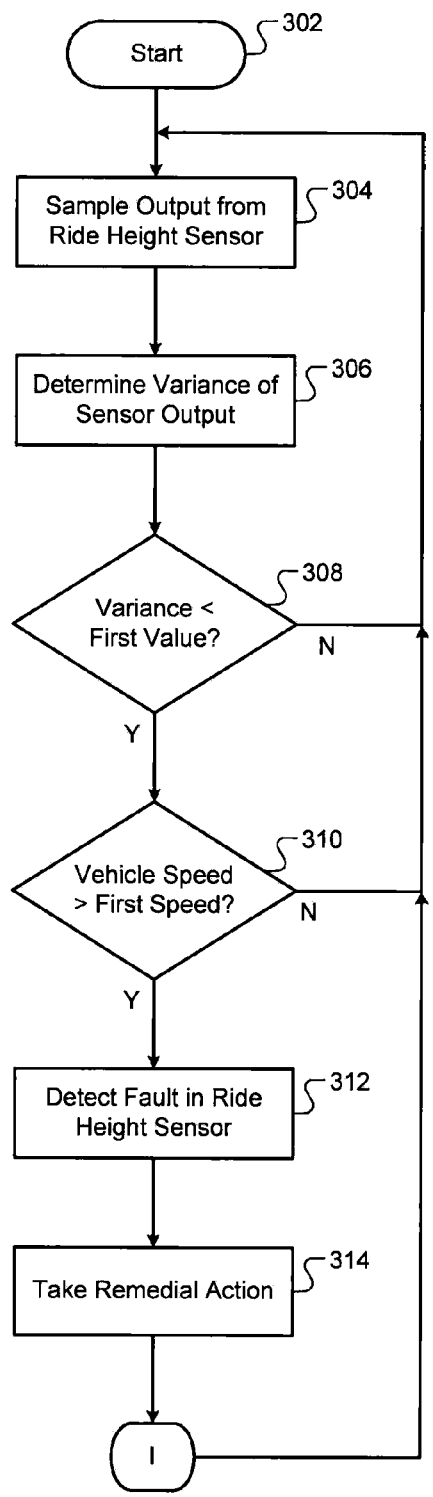
FIGS. 3 and 4 are flowcharts illustrating an example suspension control method according to the principles of the present disclosure.

Referring now to FIG. 3, a method for controlling a suspension system begins at 302. The method applies to an air suspension and other suspension types. The suspension system includes a ride height sensor that outputs a ride height signal indicating a ride height of a vehicle. At 304, the method samples the ride height signal.

At 306, the method determines a variance of the ride height signal. The number of samples for which the variance is determined may be predetermined and/or may vary based on a sampling rate at which the samples are generated. The method may determine the variance using equations (1) and (2) described above.

At 308, the method determines whether the variance is less than a first value (e.g., 0.004 millimeter$^2$). The first value may be predetermined through calibration by driving a vehicle at a low speed (e.g., 3 kph) on a smooth surface where almost no suspension movement is expected. If the variance is less than the first value, the method continues at 310. Otherwise, the method continues at 304.

At 310, the method determines whether a vehicle speed is greater than a first speed (e.g., 10 kph). If the vehicle speed is greater than the first speed, the method continues at 312. Otherwise, the method continues at 304. The method may also determine whether a fault is detected in a vehicle speed sensor that measures the vehicle speed. If 310 is satisfied and a fault is not detected in the vehicle speed sensor, the method may continue at 312. Otherwise, the method may continue at 304.

At 312, the method detects a fault in the ride height sensor. Thus, even if the variance is less than the first value, the method does not detect a fault in the ride height sensor if the vehicle speed is less than or equal to the first speed. Additionally or alternatively, the method may not sample the ride height signal or determine a variance when the vehicle speed is less than or equal to the first speed. At 314, the method takes a remedial action. The method may take remedial action by executing one or more of the steps described below with reference to FIG. 4.

Figure 4:
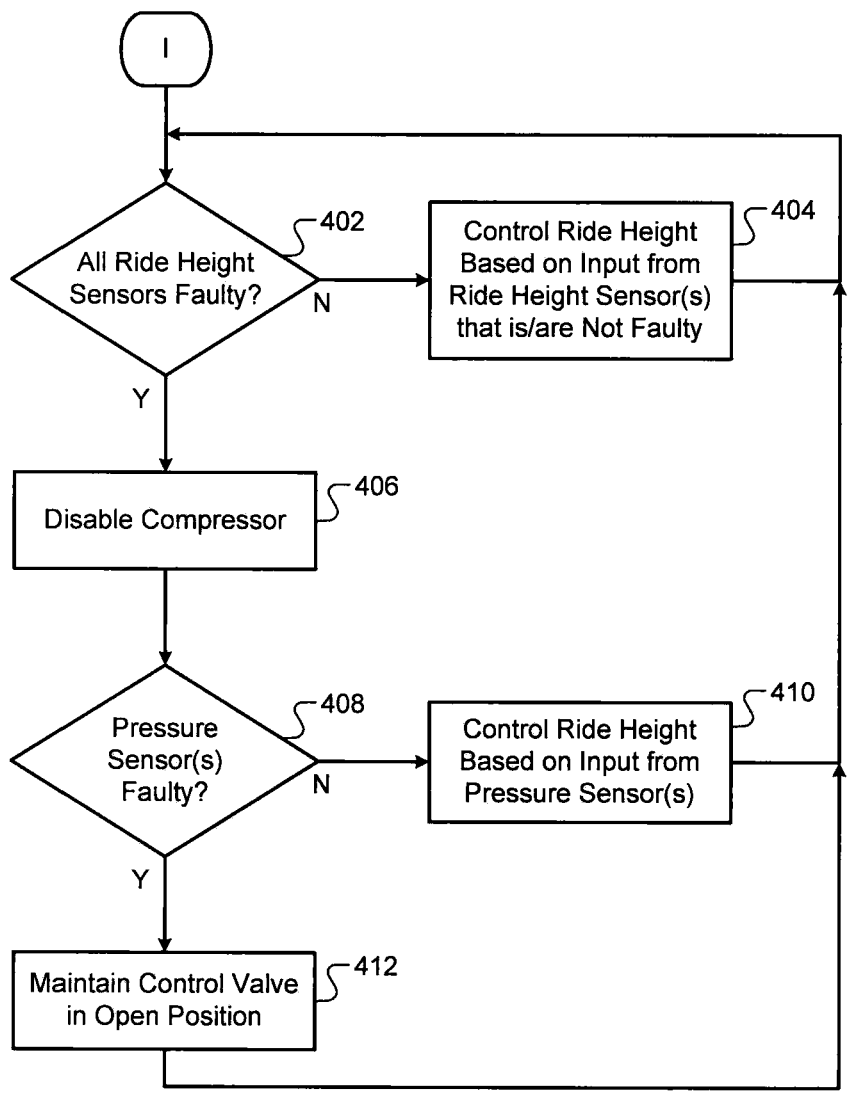

Referring now to FIG. 4, the method determines whether a fault is detected in all of the ride height sensors on the vehicle at 402. If a fault is not detected in all of the ride height sensors, the method continues at 404. Otherwise, the method continues at 406. At 404, the method controls the ride height based on input received from one or more ride height sensors in which a fault is not detected. At 406, the method disables a compressor that pressurizes air within (e.g., air bags of) the suspension system.

At 408, the method determines whether a fault is detected in one or more pressure sensors that measure pressure in the suspension system. The method may detect a fault in the pressure sensor(s) in the manner described above with reference to FIG. 2. If a fault is not detected in the pressure sensor(s), the method continues at 410. Otherwise, the method continues at 412. The method may refrain from disabling the compressor until a fault is detected in the pressure sensor as well as all of the ride height sensors. At 412, the method holds open a control valve that releases air from (e.g., air bags of) the suspension system.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A system comprising:
   a variance determination circuit that determines a variance of samples generated from a ride height signal, wherein the ride height signal is output by a ride height sensor that detects a ride height of a vehicle; and
   a fault detection circuit that detects a fault in the ride height sensor based on the variance.

2. The system of claim 1, wherein the fault detection circuit detects a fault in the ride height sensor when the variance is less than a predetermined value.

3. The system of claim 1, further comprising a signal sampling module that generates the samples from the ride height signal.

4. The system of claim 3, wherein the fault detection circuit detects a fault in the ride height sensor based on the variance when a vehicle speed is greater than a predetermined speed while the samples are generated from the ride height signal.

5. The system of claim 1, further comprising a ride height control circuit that controls the ride height by controlling at least one of a compressor that pressurizes air in an air suspension and a valve that releases air from the air suspension.

6. The system of claim 5, wherein the ride height sensor includes multiple sensors and the ride height control circuit controls the ride height based on input from at least one of the sensors when a fault is not detected in the at least one of the sensors.

7. The system of claim 6, wherein the ride height control circuit stops controlling the ride height based on input from the at least one of the sensors when a fault is detected in the at least one of the sensors.

8. The system of claim 5, wherein the ride height control circuit disables the compressor when a fault is detected in the ride height sensor.

9. The system of claim 5, wherein the ride height control circuit controls the ride height based on input received from a pressure sensor when a fault is detected in the ride height sensor, the pressure sensor detecting pressure within the air suspension.

10. The system of claim 9, wherein the ride height control circuit maintains the valve in an open position when a fault is detected in the pressure sensor.

11. The system of claim 1 wherein the variance determination circuit and the fault detection circuit include at least one of an Application Specific Integrated Circuit (ASIC), a combinational logic circuit, a field programmable gate array (FPGA), a processor and memory.

12. A method comprising:
    determining a variance of samples generated from a ride height signal, wherein the ride height signal is output by a ride height sensor that detects a ride height of a vehicle; and
    detecting a fault in the ride height sensor based on the variance.

13. The method of claim 12, further comprising detecting a fault in the ride height sensor when the variance is less than a predetermined value.

14. The method of claim 12, further comprising generating the samples from the ride height signal.

15. The method of claim 14, further comprising detecting a fault in the ride height sensor based on the variance when a vehicle speed is greater than a predetermined speed while the samples are generated from the ride height signal.

16. The method of claim 12, further comprising controlling the ride height by controlling at least one of a compressor that pressurizes air in an air suspension and a valve that releases air from the air suspension.

17. The method of claim 16, wherein the ride height sensor includes multiple sensors, the method further comprising controlling the ride height based on input from at least one of the sensors when a fault is not detected in the at least one of the sensors.

18. The method of claim 17, further comprising stop controlling the ride height based on input from the at least one of the sensors when a fault is detected in the at least one of the sensors.

19. The method of claim 16, further comprising disabling the compressor when a fault is detected in the ride height sensor.

20. The method of claim 16, further comprising controlling the ride height based on input received from a pressure sensor when a fault is detected in the ride height sensor, the pressure sensor detecting pressure within the air suspension.

21. The method of claim 20, further comprising maintaining the valve in an open position when a fault is detected in the pressure sensor.

* * * * *